A. F. PELZ.
RIM FOR VEHICLE WHEELS.
APPLICATION FILED FEB. 27, 1914.
1,129,899.
Patented Mar. 2, 1915.
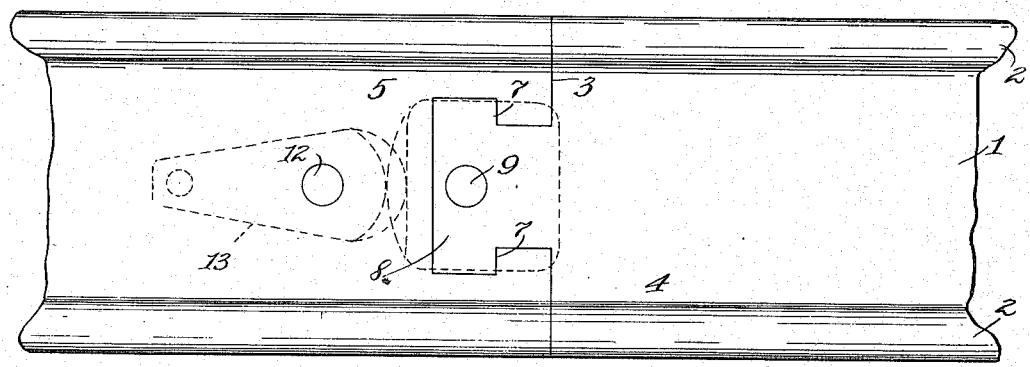
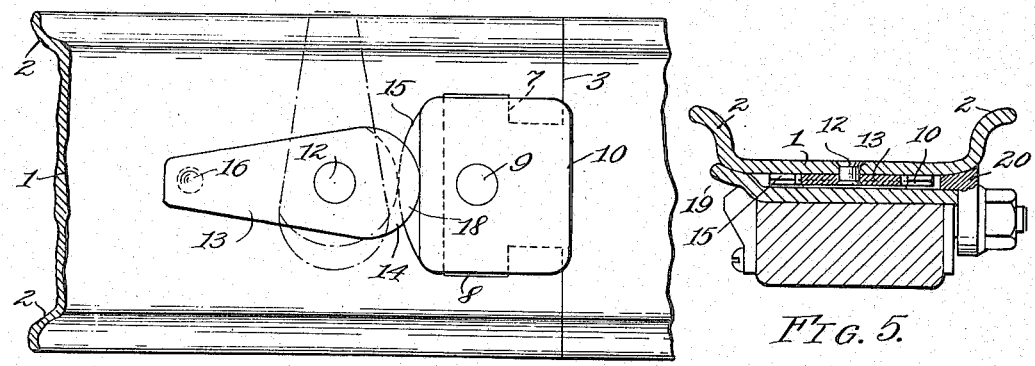
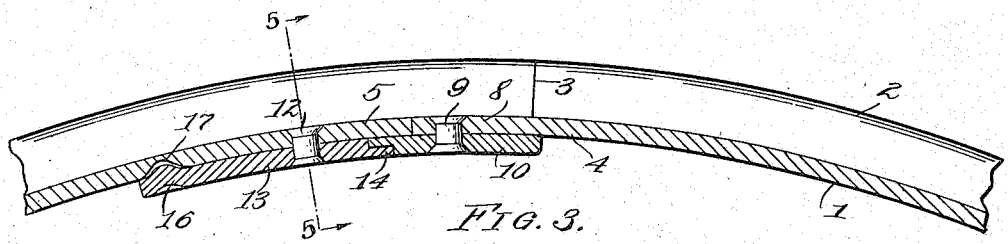
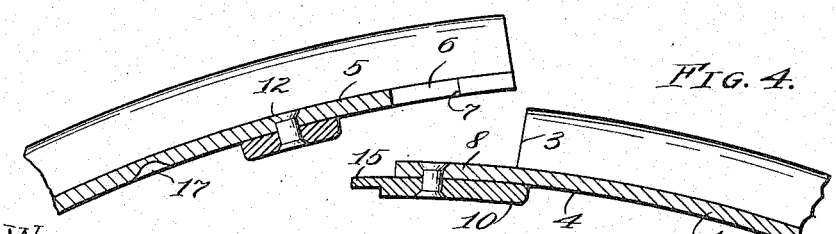
WITNESSES:
R. L. Bruck.
H. B. McGill.
INVENTOR,
Adolf F. Pelz
By Hull & Smith
ATTYS.

UNITED STATES PATENT OFFICE.

ADOLF F. PELZ, OF CLEVELAND, OHIO, ASSIGNOR OF ONE-THIRD TO CHARLES W. BROWN.

RIM FOR VEHICLE-WHEELS.

1,129,899.  Specification of Letters Patent.  Patented Mar. 2, 1915.

Application filed February 27, 1914. Serial No. 821,379.

*To all whom it may concern:*

Be it known that I, ADOLF F. PELZ, a citizen of the United States, residing at Cleveland, in the county of Cuyahoga and State of Ohio, have invented a certain new and useful Improvement in Rims for Vehicle-Wheels, of which the following is a full, clear, and exact description, reference being had to the accompanying drawings.

This invention relates to rims for vehicle wheels and has particular reference to rims of the type having outwardly projecting spaced circumferential flanges adapted to embrace the sides of a pneumatic or other road engaging tire. The rigidity of these tires renders it very difficult to pry the same over the edges of these flanges for purposes of repair or replacement, wherefore various expedients have been suggested for the purpose of removing or collapsing these flanges to facilitate passing them through the tire.

The object of the present invention is a new and improved means of securing together the ends of a rim of this nature so that the same may be strong and reliable for purposes of use and yet may be easily collapsed to permit the repair or replacement of the tire.

Other objects are the provision of a device of this character of the utmost simplicity and smallest possible number of parts; the provision of a device all of the parts of which may be made of cold-rolled metal and with a minimum of machine work; while further objects will appear as the description proceeds.

Generally speaking my invention may be defined as consisting of the combinations and constructions recited in the claims hereto annexed and illustrated, in one embodiment, in the drawings accompanying and forming a part of this application, wherein:

Figure 1 is a view of a portion of the outside face of a transversely split, tire-receiving rim, the abutting ends thereof being secured together in accordance with my invention; Fig. 2 is a view of the inside face of the same rim; Fig. 3 is a longitudinal, cross-sectional view through the joint and securing means; Fig. 4 is a longitudinal, cross-sectional view of the parts shown in Fig. 3 illustrating the same in disconnected position; and Fig. 5 is a transverse cross-sectional view of the rim taken on the line 5—5 of Fig. 3 and looking in the direction of the arrows, showing the rim in position on the wheel-felly.

Describing the parts by reference characters my improved rim consists of a metallic channel-member bent into substantially circular form, said channel member comprising a base portion 1, which, in the completed rim, possesses a substantially cylindrical shape as is here shown, and also a pair of side flanges 2—2 of the usual or any suitable shape whereby the tire is retained in place. It will be understood that the particular configuration of these side flanges is not important to the present invention. This rim is transversely split at some one point, as indicated at 3 so as to permit one end of the rim as 4 to be lapped inside of the other end 5 to allow the constriction of the rim so as to free the flanges from the walls of the tire. In order to secure together the abutting ends of this rim I preferably form one of the same with a recess 6 having its side walls undercut as illustrated at 7—7, and at the other end of the rim with a projection 8 adapted to fit into this recess and engage the undercut portions of its walls so as to retain said rim against expansion. This projection is preferably of the same thickness as the base portion and formed entirely in the same cylindrical surface therewith, thus enabling it to be formed by a punching or stamping operation and without the necessity for hot rolling. In the present embodiment I have shown the projection 8 as of T shape, and such I believe to be the most desirable construction, although it is obvious that other configurations can be employed if desired.

To the outer face of the projection 8 I secure by means of a rivet 9, or the like, a plate 10, arranged to overlap the portion of the end 5 adjacent thereto so as to determine the position of the projection 8. This plate 10 is secured to the inner face of the rim so as not to interfere with the tire, and is sufficiently narrow to lie between the side flange of the felly band and the wedge device with which it is used, so as not to interfere with the location of the rim upon the wheel. Also its transverse width is preferably slightly less than that of the recess 6 as shown in Figs. 1 and 2, so as to pervent the formation of corners in which dirt might lodge and so obstruct the operation.

Pivoted to the inner face of the end 5 of the rim, as by means of the rivet 12, is a latch 13, having one of its ends preferably undercut so as to form an overlapping portion 14 adapted to engage the opposite member, and having its other end formed for impositive engagement with the rim so as to inhibit its accidental displacement. In the present embodiment the end of the plate 10 is shown as having a rabbeted portion 15, adapted to coöperate with the overlapping end 14 of the latch, although it is obvious that with a slightly modified arrangement of parts the latch could coöperate with some other portion of the rim, such as the projection 8. The means here disclosed for restraining the latch against accidental displacement consists in embossing the same as at 16 and providing the rim with a rounded cavity 17 adapted to receive this boss. The end of the latch is preferably of cam shape as shown at 18 so as to press against the plate 10 and take up any looseness that may be present.

When it is desired to collapse the rim the latch 13 is turned to one side as shown in dotted lines in Fig. 2, after which the ends of the rim can be separated and collapsed as illustrated in Fig. 4. When the rim ends are connected together as shown in Figs. 1 and 3, the plate 10 and latch 13 are received in the recess defined between the flange 19 of the felly band and the wedge ring 20, thus shielding the same from contact with obstructions and positively preventing displacement. In addition, the distance between the outer face of the felly band and the inner face of the rim is preferably made such as to receive snugly the plate 10 and latch 13, wherefore the radial movement of the latch necessary to disengage the boss 16 from the cavity 17 is prevented, thus rendering disconnection absolutely impossible so long as the rim is in position on the wheel.

It will be understood that changes may be made in the construction, design, and arrangement of parts, and all such changes fall within my invention so far as they are included in the appended claims.

Having thus described my invention, what I claim is:—

1. A tire receiving rim comprising a transversely split metallic channel member bent to circular form, one of its ends having a recess formed with undercut walls and the other end having a projection adapted to enter said recess and interlock with the walls thereof, a plate secured to the inner face of said projection and overlapping the same so as to engage the opposite end about said recess and restrain said ends against relative radial movement in one direction, and a movable latch member carried by the inner face of said rim adjacent to its opposite end and adapted to engage a portion of said first named end, whereby the ends may be restrained against relative radial movement in the other direction.

2. A tire receiving rim comprising a transversely split metallic channel member bent to circular form, one of its ends having a recess formed with undercut walls and the other end having a projection adapted to enter said recess and interlock with the walls thereof, a plate secured to the inner face of said rim and overlapping the end thereof so as to engage the opposite end and restrain said ends against relative radial movement in one direction, the end of said plate being rabbeted, and a latch member pivoted to the interior of said rim adjacent to its opposite end and movable about a radial axis, said latch having an undercut end adapted to engage said rabbeted portion, whereby the ends of said rim may be restrained against relative radial movement in the opposite direction.

3. A tire receiving rim comprising a transversely split metallic channel member bent to circular form and having a substantially cylindrical base portion provided with marginal flanges, one end of said base portion being cut through to form a recess, the walls of which are undercut, the other end of said base portion having a projection adapted to enter said recess and interlock with the walls thereof so as to secure said rim against expansion, means affixed to the inner face of said projection and adapted to engage the opposite end of said base portion for preventing relative radial movement of said ends, certain of said means being displaceable to permit connection and disconnection of said ends.

4. A tire receiving rim comprising a transversely split metallic channel member bent to circular form and having a substantially cylindrical base portion provided with marginal flanges, one end of said base portion being cut through to form a recess, the walls of which are undercut, the other end of said base portion having a projection adapted to enter said recess and interlock with the walls thereof so as to secure said rim against expansion, a plate carried by the inner face of said rim at the end having the projection and adapted to under lie the other end of the same, whereby relative radial movement in one direction is prevented, a movable latch carried by the other end of said rim and adapted to prevent relative radial movement in the opposite direction, and means for retaining said latch in retaining position.

5. A tire receiving rim comprising a transversely split metallic channel member bent to circular form and having a substantially cylindrical base portion, one end of said base portion being cut through to form a T shaped recess with its larger portion at a distance from the end of the member, the other end of the member being extended to form a similar shaped projection adapted to fit within said recess, the thickness of said projection being substantially the same as that of said base portion, and additional members of sheet metal secured to the ends of said channel member and adapted to obstruct relative radial movement of said ends, one of said last named members being movable into and out of obstructing position.

6. In a tire receiving rim, the combination, with a transversely split metallic channel member bent to circular form and having interlocking ends, one of which is formed with a recess and the other with a projection adapted to enter said recess, of a latch member pivoted to the inner face of said first member upon a substantially radial axis and adapted to prevent relative radial movement of said ends in one direction, one of said members being formed with a boss and the other with a cavity arranged to receive said boss when said latch member is in obstructing position, said latch member being sufficiently yielding to permit said boss to be sprung into and out of said cavity, and means for preventing relative radial movement of said ends in the opposite direction.

7. The combination, with a cylindrical supporting member having spacing devices at its ends defining an outwardly opening channel, of a transversely split metallic channel member bent to circular form and arranged to seat upon said spacing devices to close said channel, said channel member having interlocking ends, one of which is recessed and the other formed with a projection adapted to enter said recess, a latch member pivoted to the inner face of said channel member upon a substantially radial axis and adapted to retain said projection in said recess, one of said last named members being formed with a boss and the other with a cavity adapted to receive said boss, said latch member being of a width to lie between said spacing devices when said channel member is in position upon said supporting member and of a thickness to be closely adjacent to the face of said supporting member so as to prevent said boss from being displaced from its cavity.

In testimony whereof, I hereunto affix my signature in the presence of two witnesses.

ADOLF F. PELZ.

Witnesses:
HAROLD E. SMITH,
CHAS. W. BROWN.